(12) United States Patent
Yamazaki

(10) Patent No.: US 8,830,810 B2
(45) Date of Patent: Sep. 9, 2014

(54) HOLOGRAPHIC OPTICAL PICKUP DEVICE, OPTICAL INFORMATION RECORDING AND REPRODUCING DEVICE, AND METHOD OF RECORDING AND REPRODUCING OPTICAL INFORMATION

(71) Applicant: Hitachi Media Electronics Co., Ltd., Oshu (JP)

(72) Inventor: Kazuyoshi Yamazaki, Yamato (JP)

(73) Assignee: Hitachi Media Electronics Co., Ltd., Kanagawa (JP)

( * ) Notice: Subject to any disclaimer, the term of this patent is extended or adjusted under 35 U.S.C. 154(b) by 0 days.

(21) Appl. No.: 13/906,598

(22) Filed: May 31, 2013

(65) Prior Publication Data

US 2013/0322224 A1  Dec. 5, 2013

(30) Foreign Application Priority Data

Jun. 1, 2012 (JP) ................................ 2012-125930

(51) Int. Cl.
*G11B 7/00* (2006.01)

(52) U.S. Cl.
USPC .................... 369/103; 369/112.03; 369/112.1; 369/112.15

(58) Field of Classification Search
None
See application file for complete search history.

(56) References Cited

U.S. PATENT DOCUMENTS

| 7,339,710 B2 * | 3/2008 | Chuang .......................... 369/103 |
| 7,724,409 B2 * | 5/2010 | Lin et al. ........................ 369/103 |
| 8,432,591 B2 * | 4/2013 | Yamakawa et al. ........... 369/103 |
| 2005/0141064 A1 | 6/2005 | Aoki et al. |

FOREIGN PATENT DOCUMENTS

| JP | 2005-196826 | 7/2005 |
| JP | 2007-304263 | 11/2007 |

* cited by examiner

*Primary Examiner* — Muhammad N Edun
(74) *Attorney, Agent, or Firm* — Antonelli, Terry, Stout & Kraus, LLP.

(57) ABSTRACT

A holographic optical pickup device includes an image sensor that detects a diffracted beam generated from the region to be reproduced when irradiating an optical information recording medium with a reference beam, and sets the detected diffraction beam as a reproduction signal, and a photodetector that is different from the image sensor, which detects the diffracted beam generated from a recorded region in the recording medium when irradiating the recording medium with the reference beam. A light receiver of the photodetector is divided into a plurality of light receiving planes so as to generate the position error signal indicating the positional shifting of the region to be recorded/reproduced of the recording medium with respect to the objective lens from a differential signal of a plurality of signals derived from the respective light receiving planes.

10 Claims, 9 Drawing Sheets

HOLOGRAPHIC OPTICAL PICKUP DEVICE, OPTICAL INFORMATION RECORDING AND REPRODUCING DEVICE, AND METHOD OF RECORDING AND REPRODUCING OPTICAL INFORMATION

CLAIM OF PRIORITY

The present application claims priority from Japanese patent application serial No. JP 2012-125930, filed on Jun. 1, 2012, the content of which is hereby incorporated by reference into this application.

BACKGROUND OF THE INVENTION (1) Field of the Invention

The present invention relates to a holographic optical pickup device, an optical information recording and reproducing apparatus, and a method of recording and reproducing optical information for recording or reproducing information on an optical information recording medium using holography.

(2) Description of the Related Art

Japanese Patent Application Laid-Open Publication No. 2005-196826 discloses related art of the present invention, aiming at providing a holographic memory medium capable of illuminating an optical spot on the recording medium with accuracy for data recording by forming the holographic memory medium which includes a data recording area and a servo information area.

SUMMARY OF THE INVENTION

Recently, double luminous flux angular multiplexing method has been proposed as the holographic technique that 4allows high-speed recording/reproduction of large capacity of data. This method requires accurate positioning control with respect to the recording/reproducing position because of difference in eccentricity depending on the respective drive units in data recording/reproduction.

In response to the aforementioned requirement, the optical information recording medium is provided with the servo information area so as to allow the positioning control as disclosed in Japanese Patent Application Laid-Open Publication No. 2005-196826. However, the aforementioned related art is disadvantageous in storage capacity and cost. Specifically, the disclosed structure reduces the area for recording the signal because of the servo information area for positioning, resulting in decreased storage capacity. Compared with the generally employed optical information recording medium, the disclosed structure increases the number of steps of manufacturing the medium, thus inevitably increasing the cost.

The present invention provides a holographic optical pickup device, an optical information recording and reproducing device, and a method of recording and reproducing optical information, which allow accurate positioning without adding a new servo information area using the double luminous flux angular multiplexing method.

For example, the present invention provides a holographic optical pickup device, which includes a light source for emitting a light beam, a split element for splitting the light beam emitted from the light source into the signal beam and the reference beam, a spatial light modulator for adding an information signal to be recorded to the split signal beam, an objective lens which irradiates the optical information recording medium with the signal beam to which the information signal is added, an image sensor that detects a diffracted beam generated from a region to be reproduced upon irradiation of the optical information recording medium with the reference beam, which is formed as a reproduction signal, and a photodetector different from the image sensor, which detects the diffracted beam generated from the recorded region in the optical information recording medium upon irradiation of the optical information recording medium with the reference beam. The signal detected by the photodetector is used to generate a position error signal indicating the positional shifting of the area to be recorded or reproduced of the optical information recording medium with respect to the objective lens.

The present invention is capable of providing a holographic optical pickup device, an optical information recording and reproducing device, and a method of recording and reproducing optical information, which allow accurate positioning without reducing the storage capacity and increasing the cost upon manufacturing of the medium.

DETAILED DESCRIPTION OF THE EMBODIMENT

Figure 1:
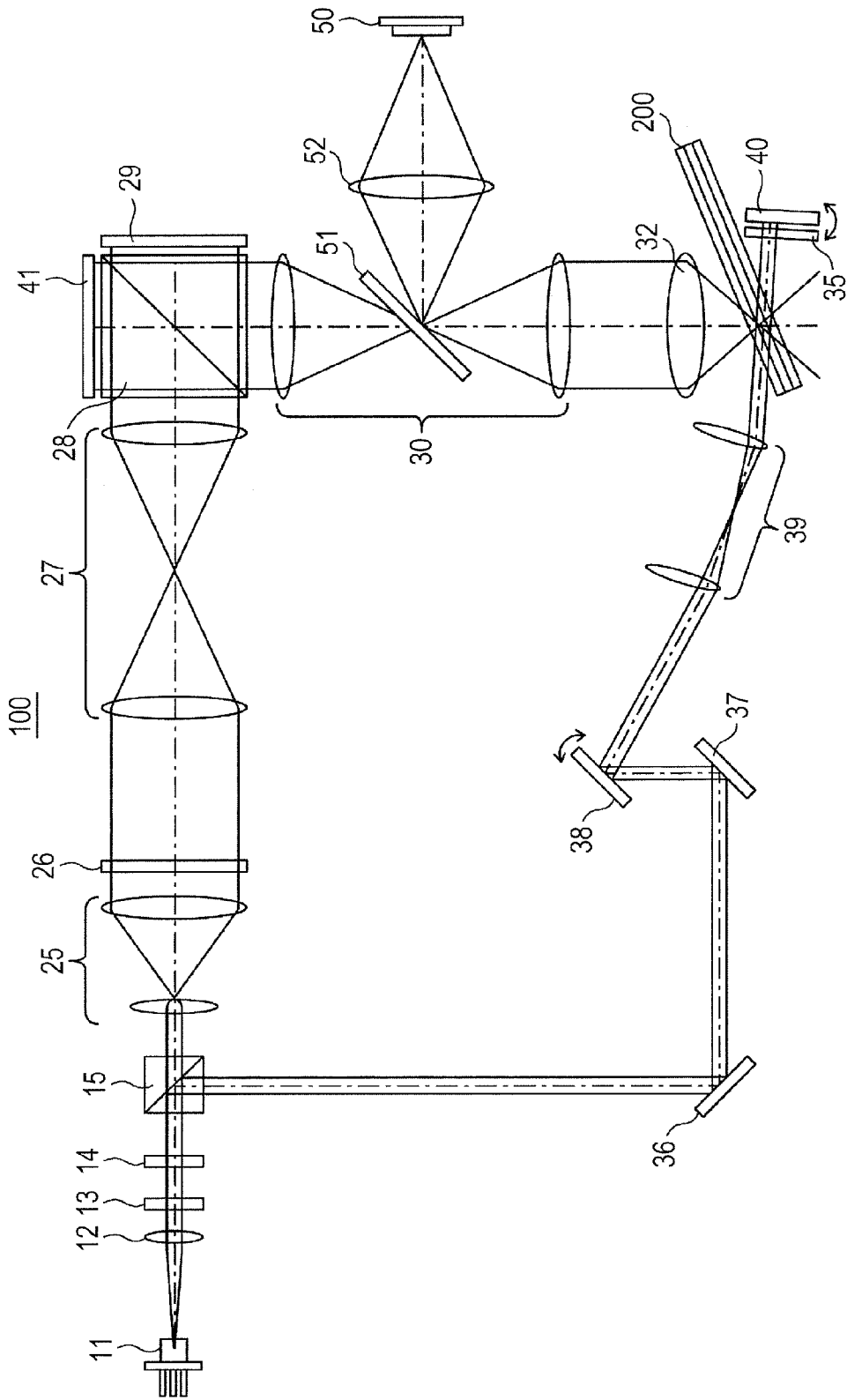
FIG. 1 is a view showing a structure of an optical system of a holographic optical pickup device according to a first embodiment.

Several embodiments according to the present invention will be described referring to the drawings.

[First Embodiment]

FIG. 1 is a view illustrating a structure of an optical system of a holographic optical pickup device according to a first embodiment. The holographic optical pickup device is configured to irradiate an optical information recording medium with the reference beam and the signal beam to form a hologram so as to record an information signal, or to irradiate the hologram on the optical information recording medium with the reference beam to reproduce the information signal.

A structure of an optical system 100 according to the embodiment will be explained along recording operations. The light beam emitted from a light source 11 is converted to have a desired beam diameter by a Collimator lens 12, passes through a shutter 13, and is incident on a polarized light variable element 14. The polarized light variable element 14 converts the light beam into the polarized light that contains P-polarized light and S-polarized light. The polarized light variable element 14 serves to convert the light beam into the predetermined polarized light in accordance with the recording operation or the reproducing operation. The embodiment is configured to convert the light beam into the P-polarized light and S-polarized light in recording, and into S-polarized light in reproduction. The light beam emitted from the polarized light variable element 14 is incident on a polarized light beam splitter (PBS) prism 15 that splits the light beam by transmitting the P-polarized light, and reflecting the S-polarized light. The light beam that transmits through the PBS prism 15 will be referred to as a signal beam, and the reflected light beam will be referred to as a reference beam.

The signal beam (P-polarized light) transmitting through the PBS prism 15 is converted to have the desired beam diameter by a beam expander 25. The signal beam transmitting through the beam expander 25 further transmits through a phase mask 26, a relay lens 27, and a PBS prism 28, and then is incident on a spatial light modulator 29. The spatial light modulator 29 is an optical element that adds an information signal such as two-dimensional image data to the signal beam. For example, the spatial light modulator may be configured to have small elements for polarization conversion (P-polarized light to S-polarized light) two-dimensionally arranged so as to drive the respective elements in accordance with the information signal to be recorded. The signal beam to which the information signal has been added by the spatial light modulator 29 is reflected by the PBS prism 28, and condensed in an optical information recording medium 200 via a relay lens 30 (including a spatial filter 51) and an objective lens 32.

Meanwhile, the reference beam (S-polarized light) reflected by the PBS prism 15 is further reflected by mirrors 36, 37, and incident on a galvanometer mirror 38. The reference beam reflected by the galvanometer mirror 38 is incident on the optical information recording medium 200 via a scanner lens 39. The galvanometer mirror 38 is an angular variable element capable of controlling the angle of the mirror in a direction of arrow, which realizes the angular multiplexing record while changing the incident angle of the reference beam to the optical information recording medium 200. The signal beam and the reference beam (double luminous flux) are incident on the optical information recording medium 200 while being overlapped with each other so that an interference fringe pattern is formed in the optical information recording medium 200. The interference fringe pattern is recorded in the recording medium as the hologram. In this embodiment, the hologram will be referred to as "page", and the recording region where the page is angular multiplexed will be referred to as "book".

After the information corresponding to one page is recorded in the optical information recording medium 200, the shutter 13 is closed. The information to be recorded subsequently is displayed by the spatial light modulator 29. Simultaneously, the galvanometer mirror 38 is rotated by a small amount so that the incident angle of the reference beam to the optical information recording medium 200 is changed. Thereafter, when the shutter 13 is opened, the information to be recorded subsequently is recorded at multiplexing angle as a new page of the same book in the optical information recording medium 200. When the page number reaches the predetermined multiplexing number, it is moved to the next book. Upon movement of the book, the optical information recording medium 200 is moved by a not shown drive unit to the position of the objective lens 32. Hereinbelow, operation of movement of the book will be explained.

The polarized light of the light beam emitted to the polarized light variable element 14 is controlled to be S-polarized light. Then the light beam (S-polarized light) emitted from the polarized light variable element 14 is reflected by the PBS prism 15, and the reference beam is only projected onto the optical information recording medium 200. The optical information recording medium 200 is moved relative to the objective lens 32 so as to position the region (recording region) where the next book is recorded on the optical information recording medium 200. This positioning is performed as described below.

The reference beam transmitting through the optical information recording medium 200 is incident on the galvanometer mirror 40 via a quarter wavelength plate 35. The galvanometer mirror 40 controls so that the reference beam is incident substantially perpendicularly, and is reflected in the opposite direction in association with the galvanometer mirror 38. The reflected reference beam becomes the phase conjugation beam via the quarter wavelength plate 35, and is incident on the optical information recording medium 200. As a result, the diffracted beam is generated from the page in the recorded book, and is emitted toward the objective lens 32. The diffracted beam is incident on the spatial filter 51 via the objective lens 32 and the relay lens 30.

The spatial filter 51 has an aperture at the center and a mirror part therearound. The aperture allows passage only of the diffracted beam from the book corresponding to the condensing position (recording or reproducing region) of the objective lens 32, and allows the mirror part to reflect the diffracted beam from the book of the other region. In recording, the book to be recorded is not formed yet, and accordingly, the diffracted beam is not generated therefrom. The reference beam is sufficiently larger than the book so that the diffracted beam is generated from the recorded book in the region other than the one to be recorded. Such diffracted beam is reflected by the mirror part of the spatial filter 51, and is incident on the photodetector 50 via the detection lens 52. The photodetector 50 receives the diffracted beam from the recorded book, and outputs the signal for generating the position error signal.

This embodiment is configured to generate the position error signal when recording a new book using the diffracted beam incident on the photodetector 50 in recording. That is, use of the signal from the recorded book allows accurate movement to the position of the book to be subsequently recorded. Generation of the position error signal will be described later.

Upon completion of movement of the optical information recording medium 200 to the next book position, the information to be recorded is displayed by the spatial light modulator 29. Then the light beam emitted to the polarized light variable element 14 is controlled to be P-polarized light and S-polarized light. The light beam emitted from the polarized light variable element 14 (P-polarized light and S-polarized light) transmits through and is reflected by the PBS prism 15, respectively so that the signal beam and the reference beam are radiated onto the optical information recording medium 200. A plurality of pages are multiplexing recorded using the shutter 13, the spatial light modulator 29 and the galvanometer mirror 38. If the number of pages reaches the predetermined multiplexing number, the optical information recording medium 200 is moved in the similar way for recording in the next new book. The aforementioned operation is repeated to allow recording while arranging the books entirely over the optical information recording medium 200.

A structure of the optical system 100 according to this embodiment will be explained as it is operated in reproduction. The light beam emitted from the light source 11 passes through the Collimator lens 12 and the shutter 13, and is incident on the polarized light variable element 14. The polarized light variable element 14 converts the light beam into the S-polarized light. The PBS prism 15 reflects the light beam. The reference beam reflected by the PBS prism 15 is incident on the optical information recording medium 200 via the mirrors 36, 37, the galvanometer mirror 38, and the scanner lens 39. The reference beam transmitting through the optical information recording medium 200 is further incident on a galvanometer mirror 40 via a quarter-wave plate 35. The galvanometer mirror 40 controls so that the reference beam is incident substantially perpendicularly, and is reflected in the opposite directions in association with the galvanometer mirror 38. As the reference beam transmits through the quarter wavelength plate 35 twice, it is converted from the S-polarized light into the P-polarized light. As the reference beam is incident on the optical information recording medium 200, the reproduction light that contains the information from the book recorded on the medium is generated as the diffracted beam of the P-polarized light. At this time, the reference beam is substantially larger than the book. The generated diffracted beam contains not only the one from the book to be reproduced but also the one from the adjacent book.

The diffracted beam emitted from the optical information recording medium 200 is incident on the spatial filter 51 in the relay lens 30 via the objective lens 32. An aperture of the spatial filter 51 allows only the recovered beam as the diffracted beam from the book to be reproduced. The diffracted beam from the other book is reflected by the mirror part. This makes it possible to split the beam into the diffracted beam from the book to be reproduced, which has passed through the aperture and the diffracted beam from the other book in reproduction.

The reproduction beam that has passed through the aperture of the spatial filter 51 is incident on the PBS prism 28 via the relay lens 30. The recovered beam as P-polarized light transmits through the PBS prism 28, and is incident on an image sensor 41. The image sensor 41 converts the incident recovered beam into the electric signal, which is then formed into the reproduction signal (image data). When completing reproduction of one page, the galvanometer mirror 38 is rotated by a small amount so as to change the incident angle of the reference beam to the optical information recording medium 200. Then the next page in the optical information recording medium 200 is reproduced. This operation is repeated to generate the angular multiplexed reproduction signal for each page.

Meanwhile, the diffracted beam from the book other than those to be reproduced, which has been reflected by the mirror part of the spatial filter 51 is incident on a photodetector 50 via a detection lens 52. The photodetector 50 outputs the signal for generating the position error signal similarly to recording.

This embodiment is configured to generate the position error signal when reproducing the new book using the diffracted beam incident on the photodetector 50 in reproduction. Specifically, use of the signal from the reproduced book other than the one to be reproduced makes it possible to have accurate movement to the book to be subsequently reproduced.

Figure 2:
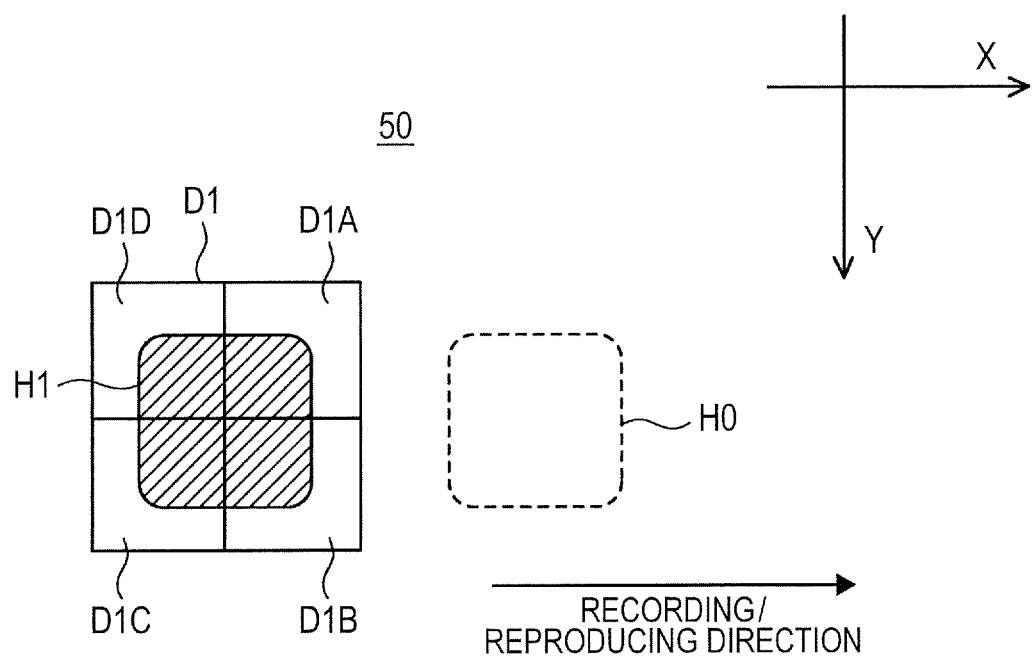
FIG. 2 is a view showing a structure of a light receiver of a photodetector 50.

The method of generating the position error signal in recording/reproduction according to this embodiment will be described. FIG. 2 is a view showing a structure of a light receiver of a photodetector 50. The photodetector 50 includes a tetrameric light receiver D1 which is provided to receive the diffracted beam H1 from the book adjacent to the book to be recorded/reproduced. The dotted line H0 of the drawing denotes the region (virtual diffracted beam) for receiving the diffracted beam that is assumed to be emitted from the book to be recorded/reproduced. The diffracted beam emitted from the book to be reproduced passes through the spatial filter 51 as described above, and is not incident on the photodetector 50. Assuming that the recording/reproducing direction on the optical information recording medium 200 is designated as X-direction, the adjacent book (diffracted beam H1) temporally precedes the position of the book to be recorded/reproduced (diffracted beam H0), and is expected to receive the diffracted beam from the recorded or reproduced book. Then the positional shifting of the diffracted beam H1 of the adjacent book is detected, and the optical information recording medium 200 is moved in X- and Y-directions for correcting the detected shifting. In this way, the new book may be recorded/reproduced by bringing the virtual diffracted beam H0 into the desired position.

It is assumed that signals from the respective light receiving planes D1A, D1B, D1C and D1D on the tetrameric light receiver D1 are designated as S1A, S1B, S1C and S1D. The position error signals XPES (X-direction) and YPES (Y-direction) of the diffracted beam H1 on the optical information recording medium 200 are expressed by the following formulae (1a) and (1b).

$$XPES = (S1A + S1B) - (S1C + S1D) \quad (1a)$$

$$YPES = (S1B + S1C) - (S1A + S1D) \quad (1b)$$

Calculations of the position error signals XPES and YPES are performed by the servo signal generation circuit of the optical information recording and reproducing device, for example. The drive signal is supplied to the medium drive element to execute the positioning control of the optical information recording medium.

This embodiment is configured to detect the position error signal using the phenomenon that the diffracted beam on the photodetector 50 is moved in association with movement of the recorded book on the optical recording information medium 200 with respect to the objective lens 32. The diffracted beam from the book adjacent to the book to be recorded/reproduced is set to be detected. The light receiver is arranged while being shifted from the position of the diffracted beam from the book to be recorded/reproduced by a predetermined amount (corresponding to one book). This makes it possible to accurately determine the position of the book to be recorded/reproduced on the optical information recording medium 200.

It may be considered to allow the image sensor 41 on which the recovered beam is incident to perform position control. However the image sensor 41 is required to detect the image signal. Meanwhile, the photodetector 50 according to this embodiment ensures high frequency driving for detecting only light intensity. It is advantageous to perform high-speed control. Although the image sensor 41 cannot perform position control in recording, this embodiment can advantageously perform position control even in recording.

This embodiment is configured to generate the position error signal using the diffracted beam of the book that has been recorded or reproduced. Unlike the structure disclosed in Japanese Patent Application Laid-Open Publication No. 2005-196826, it is not necessary to provide the optical information recording medium with the servo information area for positioning, thus avoiding problems of decrease in the medium storage capacity and cost increase in manufacturing of the medium.

Several modified examples of this embodiment will be described.

Figure 3:
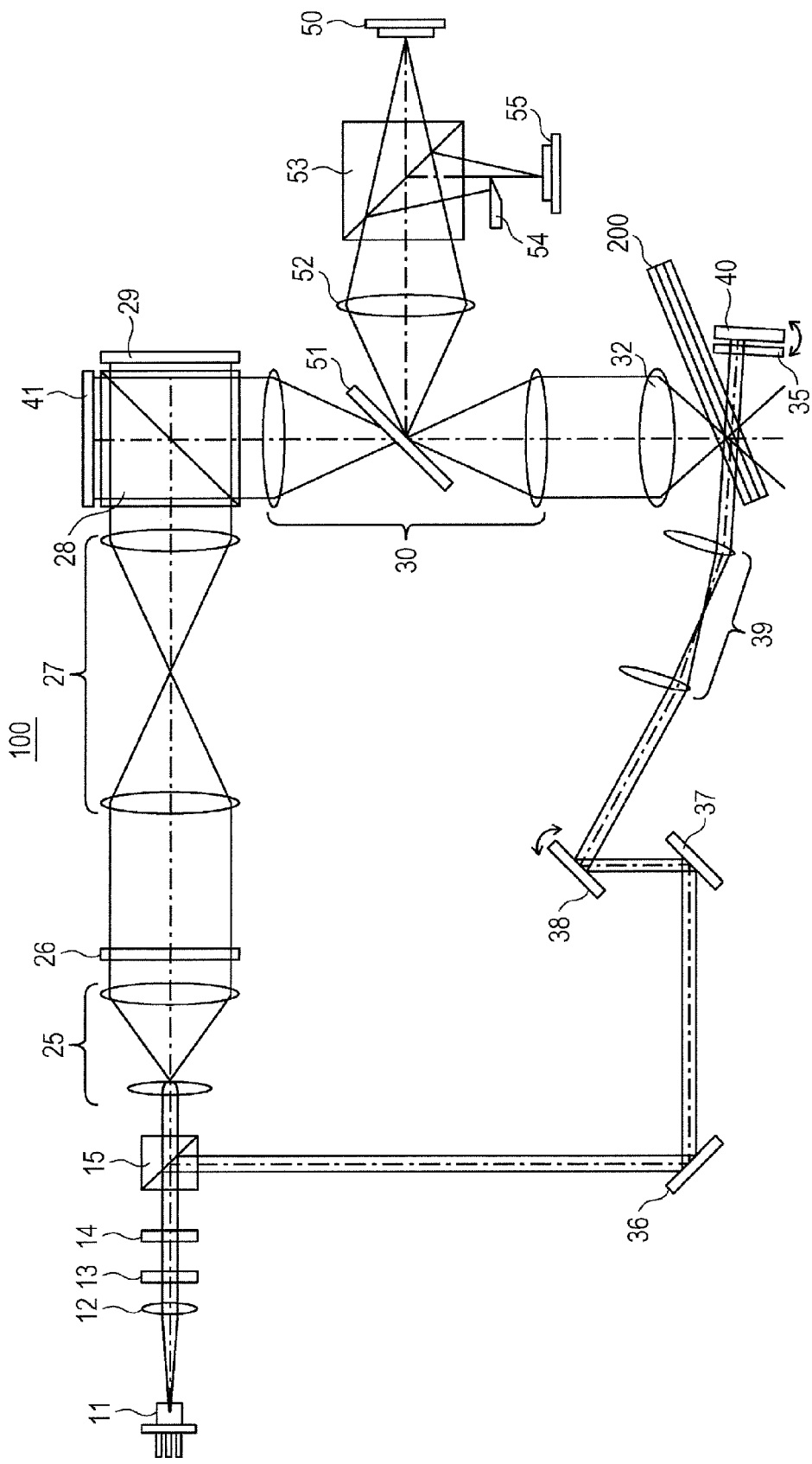
FIG. 3 is a view showing a modified example having a photodetector 55 added to the optical system.

FIG. 3 is a view showing a modified example having a photodetector 55 added to the optical system. The light beam reflected by the spatial filter 51 may be separated to generate a position error signal on the photodetector 50 and focus error signal on the photodetector 55 separately provided.

The focus error signal may be generated by providing the structure with a knife edge 54, for example, to execute the stable focus control. The mirror part is provided around the aperture of the spatial filter 51. However, the prism may be used for forming the structure.

This embodiment is configured to generate the position error signal by detecting the diffracted beam from the book other than the book to be recorded/reproduced. Therefore, the book having the diffracted beam detected may be arbitrarily positioned in any direction so long as it is other than the subject book. For example, the light receiver of the photodetector 50 may be provided apart from the book to be recorded/reproduced by the distance equal to the integral multiple of the book interval.

Figure 4:
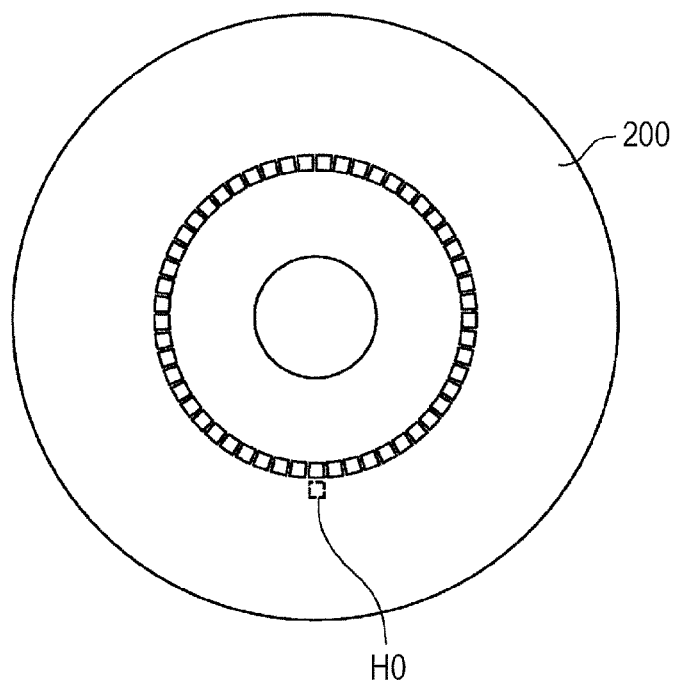
FIG. 4 is a view showing books arranged on the optical information recording medium with a circular shape.

FIG. 4 is a view showing arrangement of books on the optical information recording medium 200 with the circular (disc) shape. The photodetector 50 shown in FIG. 2 is used for recording in X-direction (circumferential direction) while rotating the circular medium 200 so that the books are sequentially formed along the circumference. The solid squares shown in the drawing represent the recorded books. The drawing shows arrangement of the books formed on the optical information recording medium 200 when recording the books by the single round for simplicity. The aforementioned recording forms the books in concentric arrangement. Then the book position (H0) where the book to be subsequently formed has to be moved (jumped) in Y-direction (radial direction, outer circumference or inner circumference) upon each completion of the recording by the single round. The structure effective for the aforementioned operation will be described hereinafter.

Figure 5:
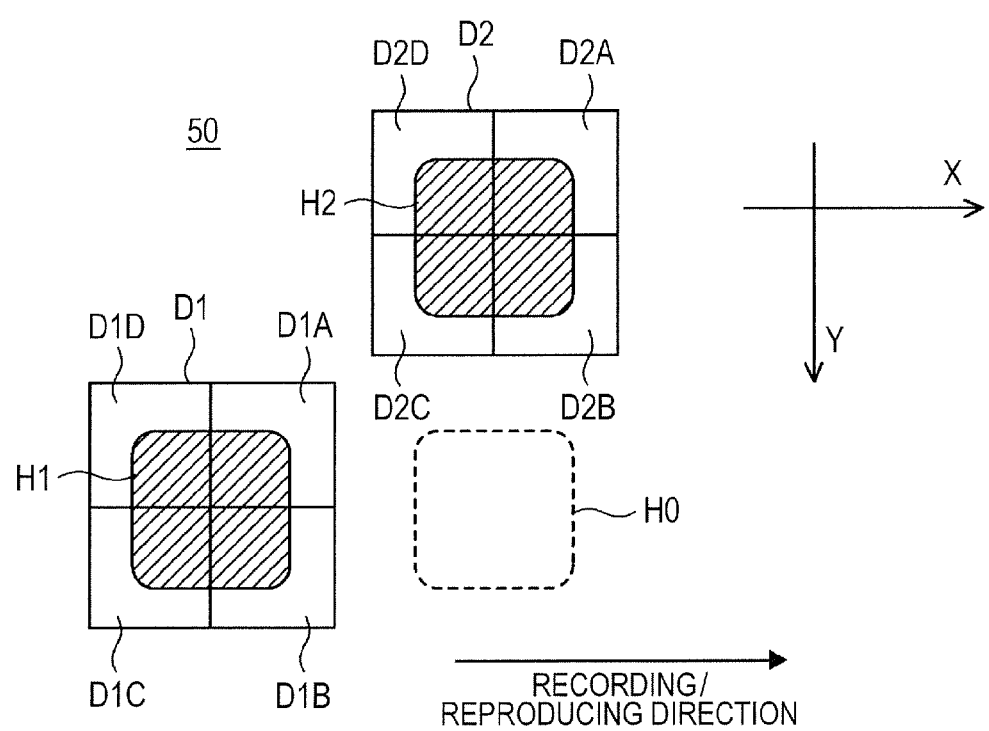
FIG. 5 is a view showing a modified example of the photodetector 50.

FIG. 5 is a view showing a modified example of the photodetector 50, which is suitable for allowing the book to be recorded and reproduced to jump in the radial direction. The photodetector 50 includes two light receivers D1 and D2 which are diagonally arranged. The position error signal derived from the light receiver D1 is used for recording on the circular medium 200 circumferentially (X-direction) so as to form the books corresponding to the single round. Then the position error signal derived from the light receiver D2 is used for jumping in the radial direction (Y-direction) of the medium so as to record one book. The diffracted beam of the thus recorded one book is detected by the light receiver D1. Then the position error signal derived from the light receiver D1 is used for recording in the circumferential direction (X-direction) again. The operation is repeated to ensure recording of the optical information recording medium as a whole. FIG. 5 shows that the light receiver D2 is shifted toward the +Y-direction with respect to the light receiver D1. However, it may be shifted toward the −Y-direction in accordance with the recording direction. A pair of light receivers may be provided in both +Y- and −Y-directions, respectively.

Figure 6:
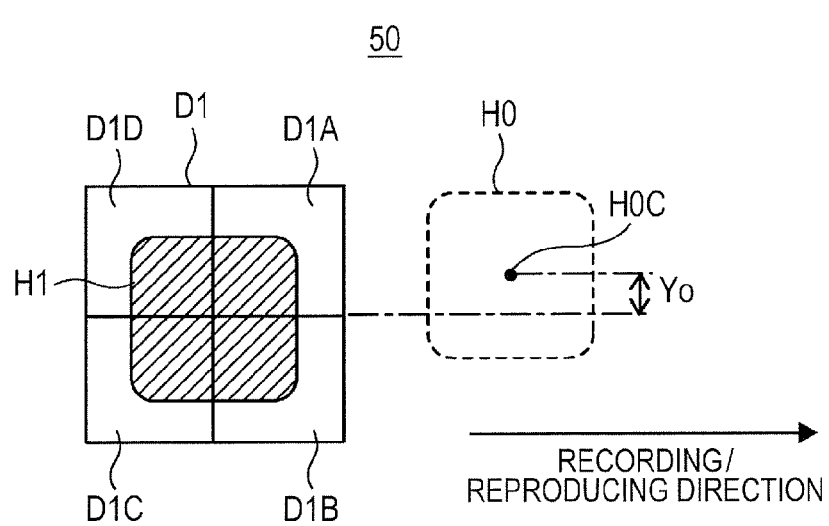
FIG. 6 is a view showing another modified example of the photodetector 50.
Figure 6:
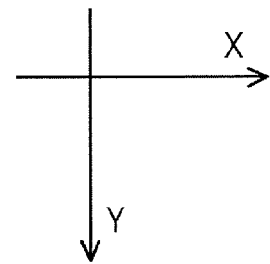

FIG. 6 is a view showing another modified example of the photodetector 50, which is suitable for recording the books spirally on the circular medium. In this example, one light receiver D1 is provided while being shifted from the center H0C of the diffracted beam H0 of the book to be recorded/reproduced by the distance Yo in the radial direction (Y-direction). This may provide the new book to be recorded/reproduced at the position radially (Y-direction) shifted with respect to the recorded/reproduced book by the distance Yo. This makes it possible to record/reproduce the books spirally on the medium.

Figure 7:
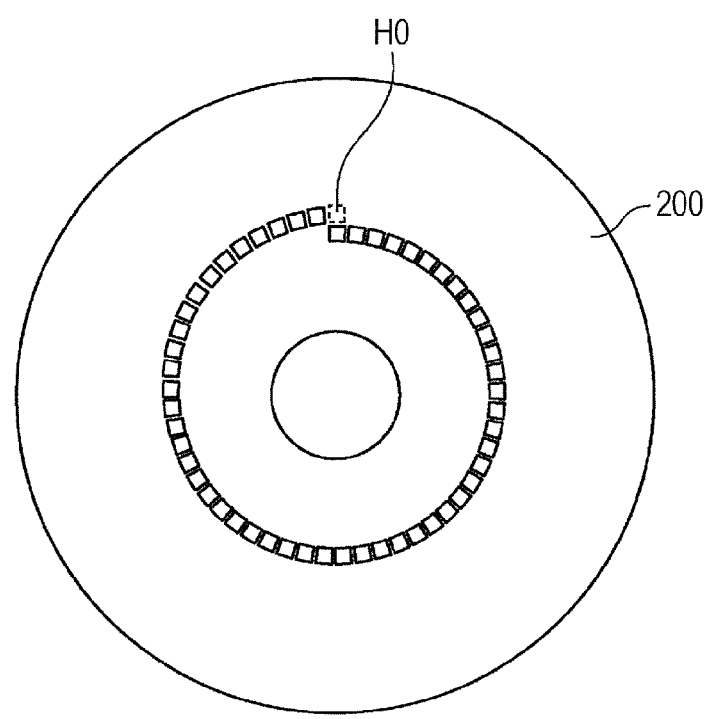
FIG. 7 is a view showing arrangement of books recorded using the photodetector 50 shown in FIG. 6.

FIG. 7 is a view showing arrangement of the books on the optical information recording medium 200 recorded using the photodetector 50 shown in FIG. 6. The books are spirally formed on the medium. Actually, however, the angle formed by the adjacent books varies depending on the radial position. Accordingly, the shift amount Yo in the Y-direction between the adjacent books has to be changed in accordance with the radial position. For this, the shift amount Yo is fixed to the intermediate value between the Yn (value on the innermost circumference) and Yg (value on the outermost circumference) for positioning by adding the offset amount in accordance with the radial position to the obtained position error signal. At this time, the offset amount to be added may be minimized by setting the value Yo to the average of those values of Yn and Yg.

The holographic optical pickup device according to the embodiment is provided with the image sensor for detecting the diffracted beam of the book, and the photodetector that is different from the image sensor. The photodetector detects the diffracted beam from the book other than the one to be recorded/reproduced, which has been already recorded or reproduced. The position error signal indicating the shifting between the position to be recorded/reproduced, and the optical information recording medium is generated from the detection signal. This makes it possible to perform high-speed positioning of the optical information recording medium with high accuracy.

[Second Embodiment]

Figure 8:
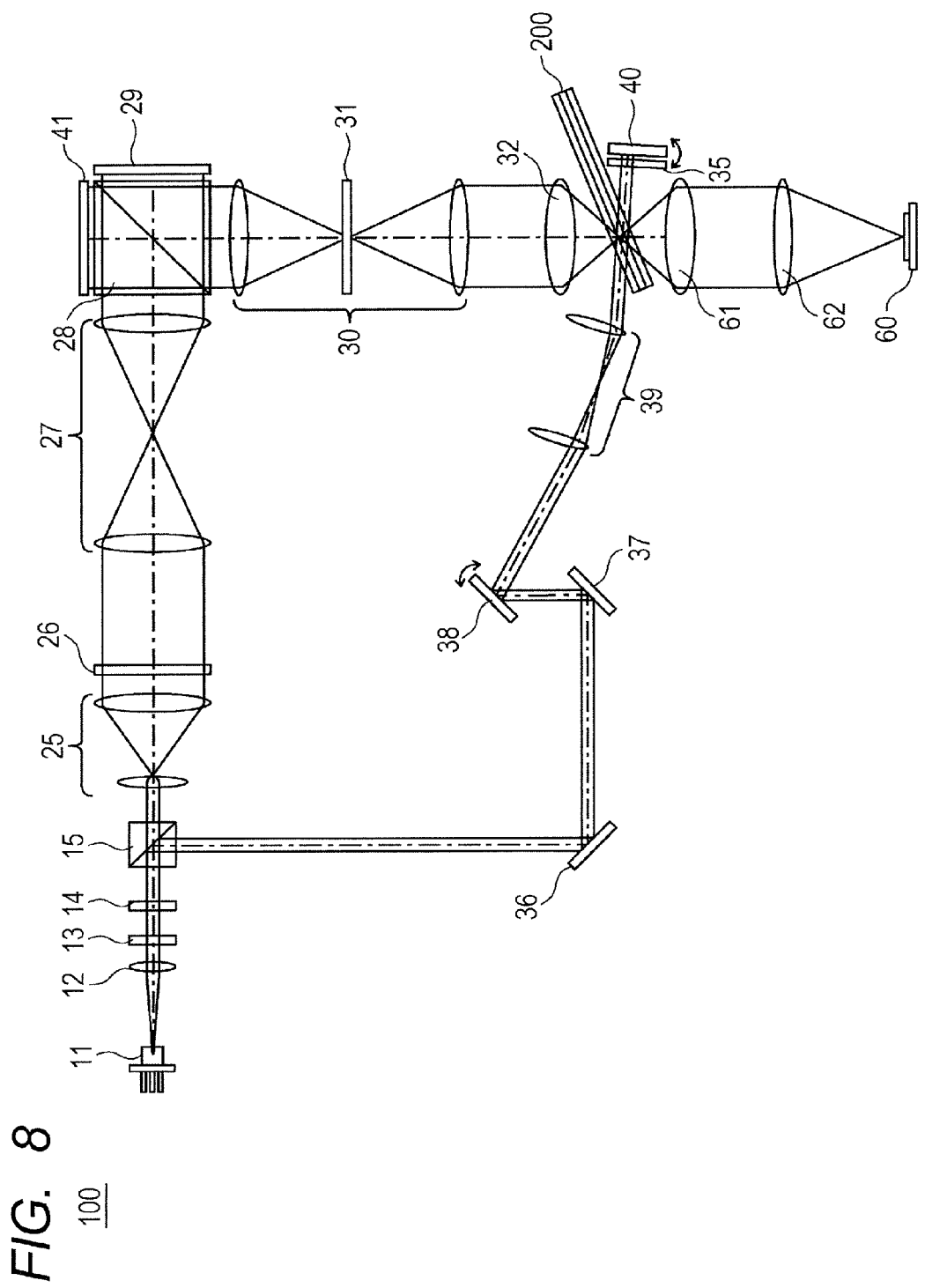
FIG. 8 is a view showing a structure of an optical system of the holographic optical pickup device according to a second embodiment.

FIG. 8 shows a structure of an optical system of the holographic optical pickup device according to a second embodiment. In this embodiment, a photodetector 60 for generating the position error signal is at the position different from the first embodiment (FIG. 1), and opposite the objective lens 32 with respect to the optical information recording medium 200. A spatial filter 31 is an optical element with an aperture, and allows passage of only the diffracted beam from the book corresponding to the condensing position (reproducing position). As the method of generating the position error signal and the principle of the book movement method of this embodiment are common to the first embodiment, redundant descriptions will be omitted.

In this embodiment, the reference beam is incident on the optical information recording medium 200 via the galvanometer mirror 38 and the relay lens 39 in recording/reproduction. The diffracted beam from the adjacent book already recorded/reproduced on the optical information recording medium 200 is generated at the side opposite (back surface of the optical information recording medium 200) the objective lens 32. The diffracted beam is incident on the photodetector 60 via lenses 61 and 62. The photodetector 60 receives the incident diffracted beams from not only the book adjacent to the one to be reproduced but also the book to be reproduced. The position error signal is then generated using the signal output from the photodetector 60.

In reproduction, the reference beam that has passed through the optical information recording medium 200 is reflected by a galvanometer mirror 40, and is incident on the optical information recording medium 200 again. Then the diffracted beam (recovered beam) that contains information from the book to be reproduced is generated. The recovered beam is emitted toward the objective lens 32, and incident on the image sensor 41 after passing through the aperture of the spatial filter 31. The reproduction signal is then generated.

Assuming that the photodetector 60 has the light receiving plane with the similar structure to that of the first embodiment (FIGS. 2, 5 and 6), the book to be recorded/reproduced on the optical information recording medium 200 may be positioned by performing the same calculation as that of the first embodiment. However, this embodiment focuses on the diffracted beam from the book to be reproduced, which is simultaneously incident on the photodetector 60 (it is clear that no diffracted beam is generated from the book to be recorded, which has not been recorded.). This embodiment is configured to directly use the diffracted beam (hereinafter referred to as the recovered beam H0) from the book to be reproduced in reproduction.

Figure 9:
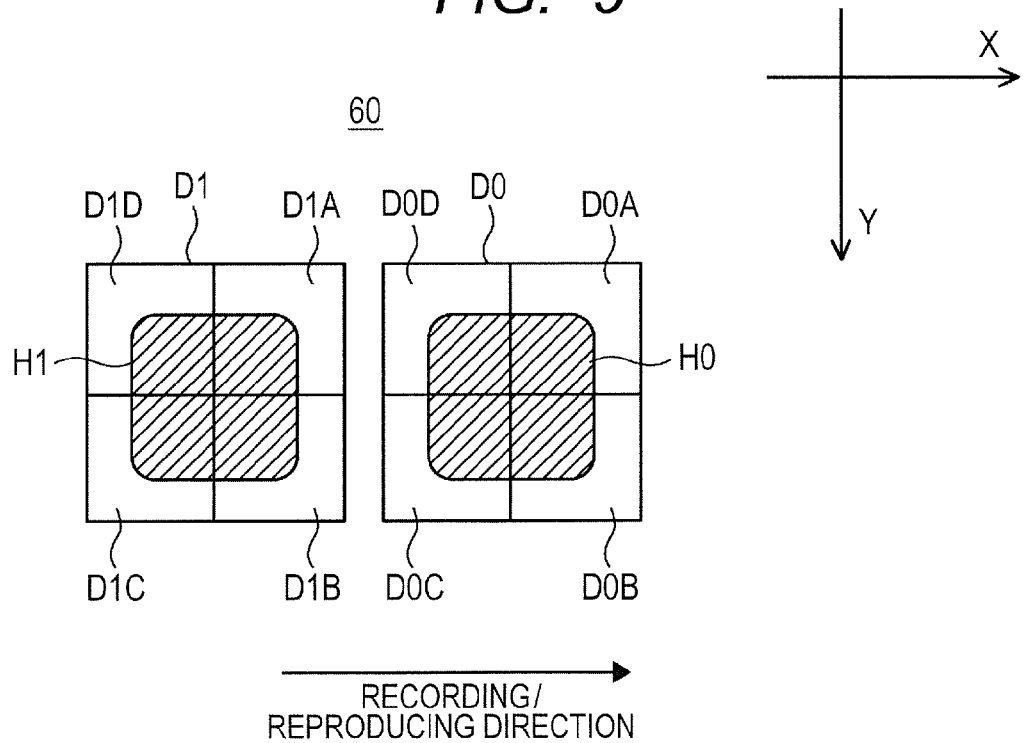
FIG. 9 is a view showing a structure of a photodetector 60.

FIG. 9 shows the structure of the photodetector 60. The photodetector 60 includes two light receivers D0 and D1, each divided into four, arranged in the recording/reproducing direction (X-direction). In recording, the diffracted beam H1 from the recorded adjacent book is detected at the light receiver D1. In reproduction, the reproduction light H0 from the book to be reproduced is detected at the light receiver D0.

It is assumed that signals derived from the light receiving planes D1A, D1B, D1C and D1D on the light receiver D1 are designated as S1A, S1B, S1C, S1D, and signals derived from the light receiving planes D0A, D0B, D0C and D0D on the light receiver D0 are designated as S0A, S0B, S0C and S0D. Position error signals XPES (X-direction) and YPEX (Y-direction) of the diffracted beams H1 and H0 on the optical information recording medium 200 in recording/reproducing are expressed by the following formulae (2a), (2b), (3a) and (3b).

<Recording>

$$XPES=(S1A+S1B)-(S1C+S1D) \quad (2a)$$

$$YPES=(S1B+S1C)-(S1A+S1D) \quad (2b)$$

<Reproducing>

$$XPES=(S0A+S0B)-(S0C+S0D) \quad (3a)$$

$$YPES=(S0B+S0C)-(S0A+S0D) \quad (3b)$$

The formulae (2a) and (2b) calculated in recording are the same as the aforementioned formulae (1a) and (1b). Meanwhile, the diffracted beam H0 from the book to be reproduced is directly detected in reproduction, which is advantageous in improvement of the detection accuracy compared with the case where the diffracted beam of the adjacent book is detected.

Figure 10:
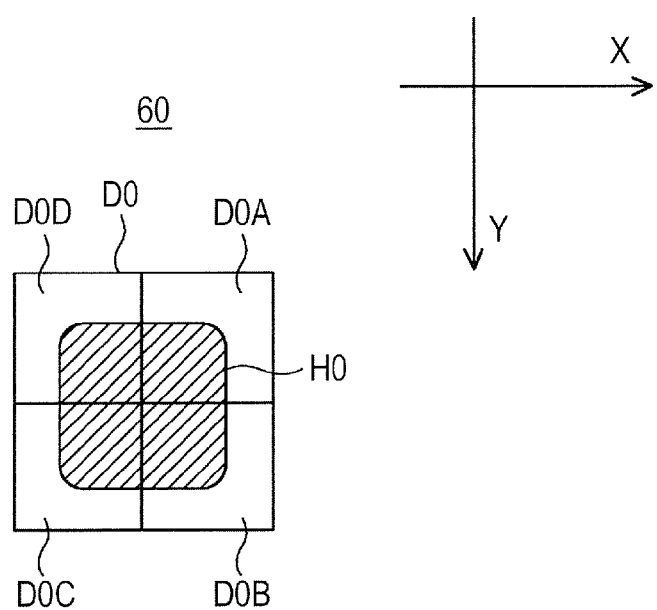
FIG. 10 is a view showing another light receiver of the photodetector according to a second embodiment.
Figure 11:
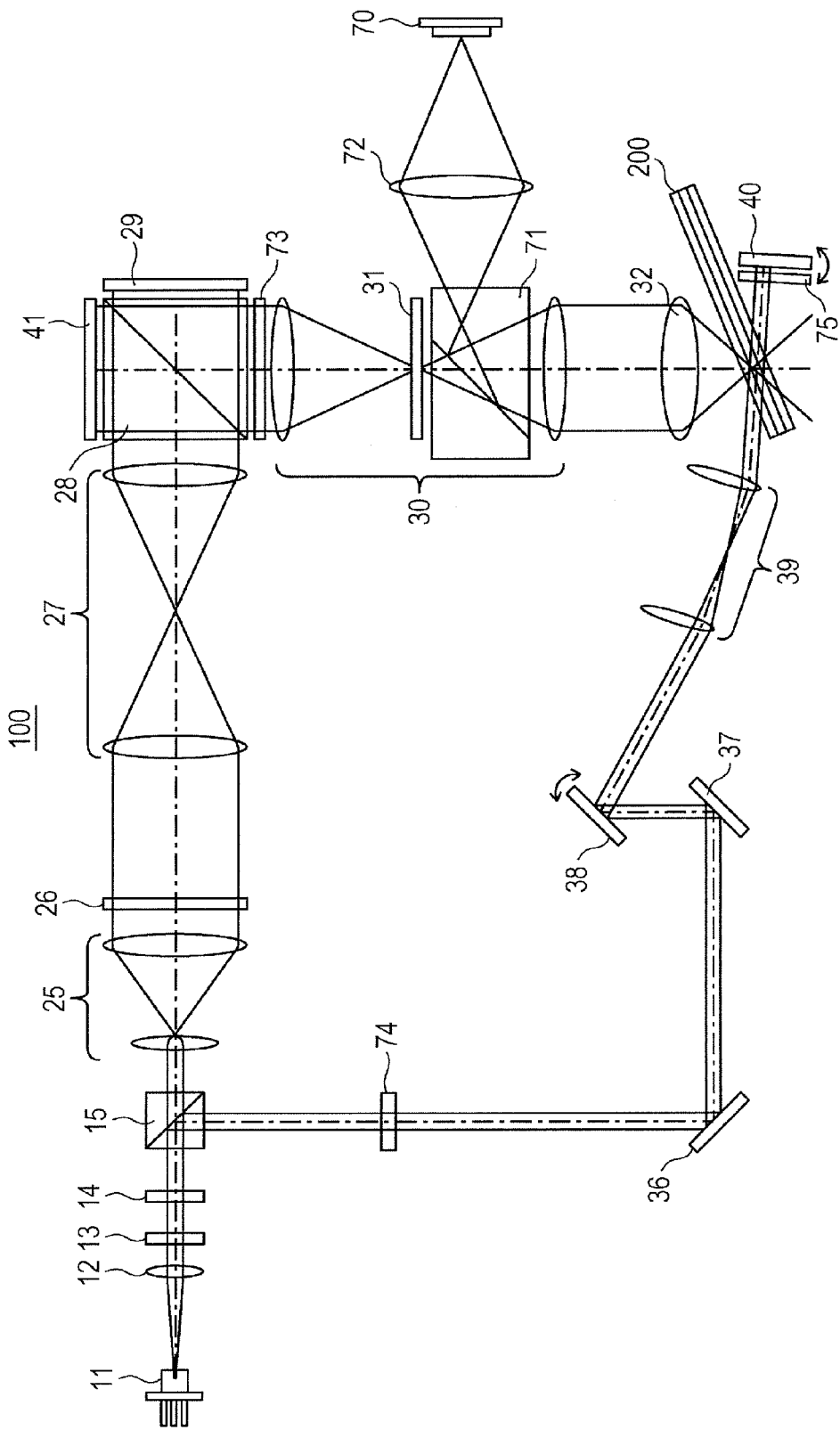
FIG. 11 is an explanatory view of the optical system according to a third embodiment.

FIG. 10 is a view showing a structure of the photodetector 60 for reproduction only. The light receiver D0 is only required by the photodetector 60 for performing the position control in reproduction. The other light receiver D1, thus, is omitted.

In this embodiment, the optical information recording medium needs no servo information area for positioning, thus eliminating disadvantages of decrease in the medium storage capacity and cost increase in manufacturing of the medium. Furthermore, the embodiment is configured to generate the position error signal using the recovered beam obtained by directly injecting the diffracted beam to the photodetector 60 from the book to be reproduced. It is therefore effective for improving the positioning accuracy in reproduction compared with the structure according to the first embodiment.

[Third Embodiment]

FIG. 10 shows a structure of the optical system of the holographic optical pickup device according to a third embodiment. In this embodiment, a photodetector 70 is provided at the side of the objective lens 32 likewise the first embodiment (FIG. 1). The photodetector 70 is capable of detecting the recovered beam H0 in reproduction likewise the second embodiment. In this embodiment, several elements are added/changed for the purpose of recording/reproducing the book with no difficulty. The redundant explanations similar to those of the first and the second embodiments will be omitted. This embodiment is configured to record the information on the optical information recording medium while shifting the incident angles of the reference beams to the corresponding pages between adjacent books each by the small angle.

In this embodiment, in recording/reproduction, the reference beam (S-polarized light) is converted into the P-polarized light by a half wavelength plate 74, and incident on the optical information recording medium 200 via the galvanometer mirror 38. The reference beam further transmits through the optical information recording medium 200, and is reflected by the galvanometer mirror 40. The beam is then incident on the optical information recording medium 200 again. The reference beam as the P-polarized light passes through the wavelength plate 75 (at arbitrary phase angle) twice so as to be converted into the polarized component formed by combining the S-polarized light and P-polarized light. The diffracted beam as the combination of the S-polarized beam and P-polarized beam is generated from the book already recorded on the optical information recording medium 200, and is emitted toward the objective lens 32. At this time, the reference beam is sufficiently larger than the book, and contains the diffracted beam from not only the book to be reproduced but also the adjacent book.

The diffracted beams are incident on a PBS prism 71 in the relay lens 30 via the objective lens 32. The PBS prism 71 allows transmission of the P-polarized component of the incident diffracted beam, and reflects the S-polarized component. The diffracted beam (S-polarized light) reflected by the PBS prism 71 is incident on the photodetector 70 via a detection lens 72. The position error signal is generated using the signal output from the detector 70.

In this embodiment, the S-polarized component of the diffracted beam from the medium 200 is directly incident on the photodetector 70 which is capable of receiving the diffracted beam of not only the adjacent book that has been already recorded but also the book to be reproduced. In other words, in reproduction, this embodiment is capable of detecting the reproduction light H0 likewise the second embodiment, and accordingly, the position error signal may be generated in reproduction using the reproduction light H0. The calculation may be performed in the similar way to the second embodiment using the photodetector 60 with the light receiving plane as shown in FIGS. 9 and 10, for example.

This embodiment has the advantage that the control accuracy is improved by directly detecting the diffracted beam from the book to be reproduced compared with the case of detecting the diffracted beam from the adjacent book. This embodiment is configured to arrange the photodetector 70 at the side of the objective lens 32, which prevents increase in overall size of the optical pickup device.

The recording/reproducing operations performed by the structure of the embodiment will be described.

In recording, the signal beam (P-polarized light) becomes the signal beam (S-polarized light) to which the information signal is added by a spatial light modulator 29. Thereafter, the beam is condensed on the optical information recording medium 200 via a polarized light variable element 73, the relay lens 30 (including the spatial filter 31 and the PBS prism 71), and the objective lens 32. The polarized light variable element 73 performs conversion of the light into the predetermined polarized light in accordance with the recording or reproducing operation. In this case, in recording, the S-polarized light is converted into the P-polarized light, and in reproduction, the incident polarized light is directly emitted. Meanwhile, the reference beam (S-polarized light) is converted into the P-polarized light by the half wavelength plate 74, and incident on the optical information recording medium 200 via the galvanometer mirror 38 and the like. At this time, the galvanometer mirror 38 is controlled so that the reference beam is incident while having the incident angles to the corresponding pages between the adjacent books shifted by the small angle. The aforementioned signal beam and the reference beam are incident on the optical information recording medium 200 while being overlapped with each other so that the information signal is recorded as the hologram.

In reproduction, the reference beam (S-polarized light) is converted into the P-polarized light by the half wavelength plate 74, and incident on the optical information recording medium 200 via the galvanometer mirror 38 and the like. The beam further transmits through the optical information recording medium 200, and is reflected by the galvanometer mirror 40 via the wavelength plate 75. It is then incident on the optical information recording medium 200 again. The reference beam is converted into the polarized light component as synthesis of the S-polarized light and the P-polarized light. The diffracted beam formed as the synthesis of the S-polarized light and the P-polarized light is generated from the book already recorded on the optical information recording medium 200 so as to be emitted toward the objective lens 32.

The diffracted beam is incident on the PBS prism 71 via the objective lens 32. The P-polarized light component transmits through the PBS prism, and is incident on the spatial filter 31. The spatial filter 31 has the aperture that allows passage of only the recovered beam from the book to be reproduced, and no passage of the diffracted beam from the other books. This may separate only the recovered beam from the book to be reproduced. The recovered beam that has transmitted through the spatial filter 31 further transmits through the polarized light variable element 73 (in reproduction, the polarized light conversion is not performed). Then the beam transmits through the PBS prism 28, and is incident on the image sensor 41 so as to generate the reproduction signal.

In this embodiment, the PBS prism 71 is provided for splitting the light beam. However, a generally employed BS prism may also be used.

The aforementioned the first, the second and the third embodiments may be modified as follows.

The optical system may be configured to allow detection of the diffracted beam from the optical information recording medium without being limited to those embodiments. In the embodiments, the galvanometer mirror 38 is employed for angular control in the double luminous flux angular multiplexing method. However, the acousto-optical device and the angular variable element such as MEMS (Micro-Electro-Mechanical Systems) may be employed. The third embodiment employs the galvanometer mirror 38 for the angular control of the reference beam. However, it is possible to execute the control using the galvanometer mirror 40 in reproduction. Further, positioning control by a position error signal may be performed by detecting the control only when the book is moved or by always detecting the control.

The respective embodiments are configured to control the polarized light variable element 14 when moving the book in recording. However, arbitrary structure may be employed so long as only the reference beam is incident in moving. For example, the separate shutter may be provided on the optical path of the signal beam. Recording angles of the reference beams of the pages corresponding to the book for detecting the position error signal and the book to be recorded in recording may be either correlated or not.

In the respective embodiments, the reference beam is sufficiently larger than the book, which in turn generates the unnecessary recording region. For this, it is possible to insert the variable aperture or the beam expander with variable luminous flux diameter in the optical path, for example. In moving the position, the position error signal may be detected by increasing the beam diameter of the reference beam. In recording and reproducing, the beam diameter of the reference beam may be decreased. This makes it possible to reduce the unnecessary noise component resulting from the reference beam in recording. When the beam expander is provided, in association with decrease in the beam diameter, the energy density of the reference beam may be increased. This makes it possible to allow high speed recording/reproducing operation as the energy density of the reference beam may be increased.

In the respective embodiments, the position error signals are designated as XPES and YPES. However, they may be expressed in directions other than those designated in the drawing. In such a case, they may be represented by inclined parting lines, or inclined light receivers. The embodiment is configured to detect the position error signal by detecting position of the diffracted beam. A plurality of light receivers may be provided so long as the light receiver for detecting the position error signal has a plurality of divided light receiving planes.

[Fourth Embodiment]

Figure 12:
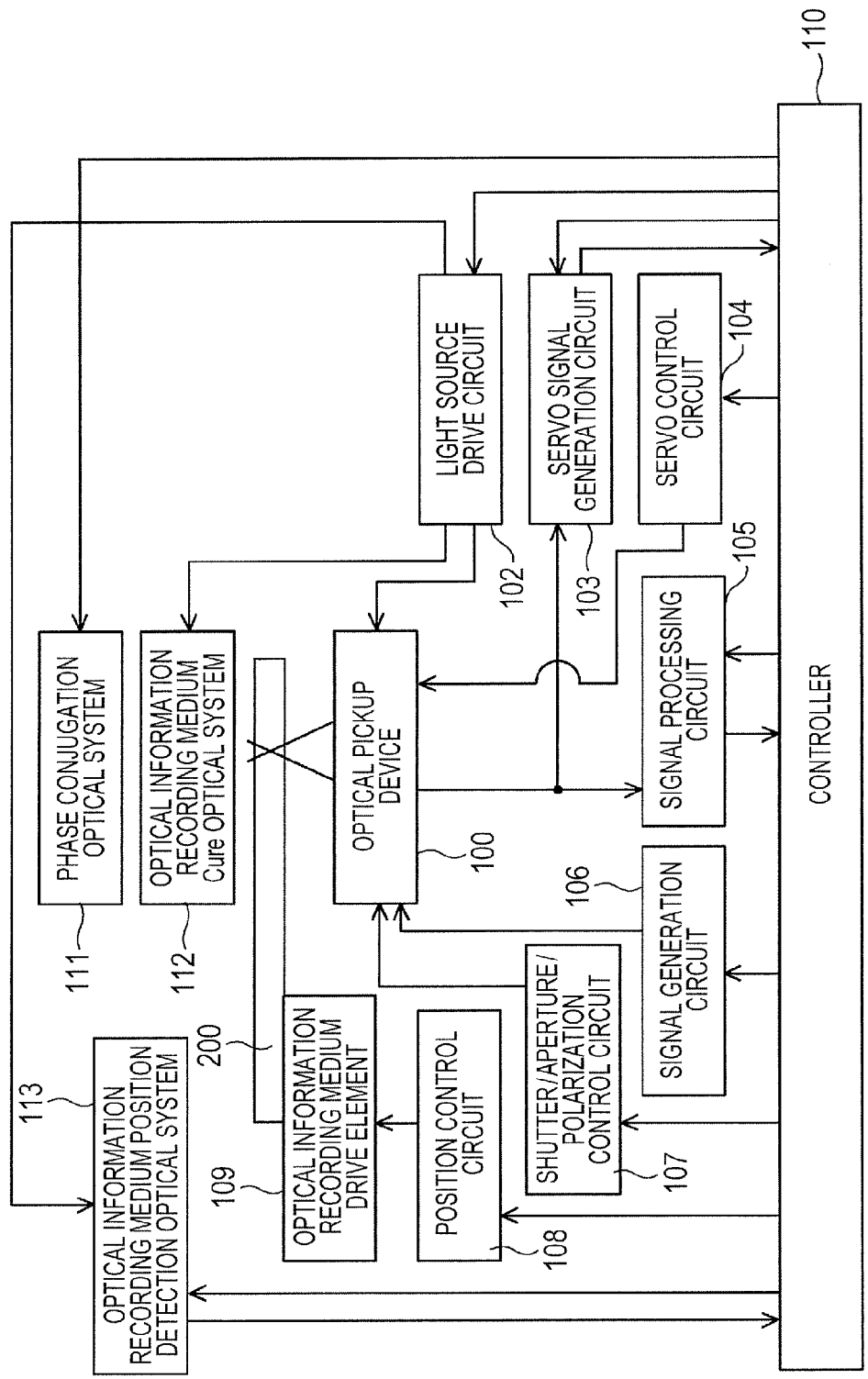
FIG. 12 is a view showing the holographic optical information recording and reproducing device according to a fourth embodiment.

FIG. 12 shows a structure of an optical information recording and reproducing device according to a fourth embodiment. The optical information recording and reproducing device records and/or reproduces the information signal by forming the hologram on the optical information recording medium. The optical information recording and reproducing device is configured to have the mechanism/optical system, for example, an optical information recording medium drive element 109, a phase conjugate optical system 111, an optical information recording medium Cure optical system 112, and an optical information recording medium position detection optical system 113 in addition to the optical pickup device 100 as described in the respective embodiments. The optical information recording medium 200 is configured to change the relative recording/reproducing position with respect to the optical pickup device 100.

The optical pickup device 100 irradiates the optical information recording medium 200 with the reference beam and the signal beam to form the hologram so as to record the information signal. The device irradiates the hologram on the optical information recording medium 200 with the reference beam to reproduce the information signal. Circuits as described below are provided as the control system of the recording and reproducing operations, and are controlled by a controller 110.

The information signal to be recorded is transmitted to the spatial light modulator (29 of FIG. 1) in the optical pickup device 100 via a signal generation circuit 106 so that the signal beam is modulated by the spatial light modulator. When reproducing the information signal recorded on the optical information recording medium 200, the phase conjugate beam of the reference beam emitted from the optical pickup device 100 is generated by the phase conjugate optical system 111. The phase conjugate beam denotes the light wave that proceeds in the inverse direction while holding the same wavefront as that of the input beam. The reference beam reflected by the galvanometer mirror 40 described referring to FIG. 1 corresponds to the phase conjugate beam. The diffracted beam (recovered beam) generated by the phase conjugate beam is detected by the image sensor (41 of FIG. 1) in the optical pickup device 100 so that a signal processing circuit 105 generates the reproduction signal.

A light source drive circuit 102 supplies predetermined light source drive current to light sources in the optical pickup device 100, the optical information recording medium Cure optical system 112, and the optical information recording medium position detection optical system 113. The light beam with predetermined intensity is emitted from the respective light sources. A shutter/aperture/polarized light control circuit 107 controls the time for opening and closing the shutter (13 of FIG. 1) within the optical pickup device 100 so as to adjust the time taken for irradiating the optical information recording medium 200 with the reference beam and the signal beam. The optical information recording medium Cure optical system 112 generates the light beam used for the pre-cure and post-cure operations on the optical information recording medium 200. The pre-cure denotes the pre-process for preliminarily projecting the predetermined light beam before irradiating the desired position of the optical information recording medium 200 with the reference beam and the signal beam. The post-cure denotes the post-process for projecting the predetermined light beam so as not to allow the information to be recorded once it has been recorded on the desired position of the optical information recording medium 200.

The optical information recording medium position detection optical system 113 detects a general position of the optical information recording medium 200, and allows the position control circuit 108 to adjust the general position of the optical information recording medium 200 using the detection signal.

The recording method using hologram is capable of recording the information with extra-high density. However, the method significantly narrows the acceptable error with respect to inclination and displacement of the optical information recording medium 200. For this reason, this embodiment is configured to generate the angular error signal and the position error signal using the signal output from the optical pickup device 100.

The servo signal generation circuit 103 generates the position error signal for servo control using the signal output from the photodetector 50. The position control circuit 108 controls positioning of the optical information recording medium 200 via the optical information recording medium drive element 109. The shutter/aperture/polarized light control circuit 107 may be configured to change the aperture size of the spatial filter 51 in the optical pickup device 100, and to change the light beam diameter of the reference beam by driving the beam expander for detection of the position error signal.

The servo signal generation circuit 103 generates the angular error signal using the signal output from the photodetector (not shown) separately provided, and the angular error signal for servo control so as to execute angular control of the galvanometer mirror (38 of FIG. 1) via the servo control circuit 104.

The optical pickup device 100, the phase conjugate optical system 111, the optical information recording medium Cure optical system 112, and the optical information recording medium position detection optical system 113 may have a part or all of the optical systems combined into a single structure for simplification.

The optical information recording and reproducing device according to this embodiment includes the optical pickup device according to the first to the three embodiments so that the angular error signal is generated using the signal output from the photodetector in the optical pickup device. This makes it possible to realize high accuracy and high speed of a servo signal that controls the relative positions of the optical pickup device (objective lens) and an optical information recording medium.

It is to be understood that the present invention is not limited to any of the aforementioned embodiments, and may include various modified examples. The aforementioned embodiments have been described in detail for the purpose of providing a comprehensible explanation of the present invention, and are never limited to the one provided with all the structures as described above. It is possible to add the structure of any one of the embodiments to that of the other embodiment. Alternatively, a part of the structure of any one of the embodiments may be added to, deleted from, and replaced with the other structure of the embodiment.

What is claimed is:

1. A holographic optical pickup device for recording an information signal by irradiating an optical information recording medium with a reference beam and a signal beam to form a hologram, or reproducing the information signal by irradiating the hologram on the optical information recording medium with the reference beam, comprising:
   a light source for emitting a light beam;
   a split element for splitting the light beam emitted from the light source into the signal beam and the reference beam;
   a spatial light modulator for adding the information signal to be recorded to the split signal beam;
   an objective lens which irradiates the optical information recording medium with the signal beam to which the information signal is added;
   an image sensor that detects a diffracted beam generated from a region to be reproduced through the objective lens, and forms the diffracted beam into a reproduction signal when irradiating the optical information recording medium with the reference beam; and
   a photodetector different from the image sensor, which detects the diffracted beam generated from a plurality of recorded regions that is different from the region to be reproduced in the optical information recording medium when irradiating the optical information recording medium with the reference beam,
   wherein the signal detected by the photodetector is used to generate a position error signal indicating the positional shifting of the area to be recorded or reproduced of the optical information recording medium with respect to the objective lens.

2. The holographic optical pickup device according to claim 1, further comprising a spatial filter that reflects the diffracted beam of the optical information recording medium, which has been generated from a region other than a region to be recorded or reproduced,
   wherein the photodetector includes a plurality of light receivers to detect the diffracted beam generated from a plurality of regions other than the region to be recorded or reproduced, which has been reflected by the spatial filter.

3. The holographic optical pickup device according to claim 2, wherein a plurality of light receivers of the photodetector detect the diffracted beam generated from a plurality of regions adjacent to the region to be recorded or reproduced in the optical information recording medium.

4. The holographic optical pickup device according to claim 1, wherein the photodetector includes a first light receiver provided to detect, in recording, the diffracted beam generated from a region other than the region to be recorded in the optical information recording medium, and a second light receiver provided to detect, in reproduction, the diffracted beam generated from the region to be reproduced in the optical information recording medium.

5. The holographic optical pickup device according to claim 4, further comprising a prism that allows incidence of the diffracted beam generated from the optical information recording medium via the objective lens, and splits the diffracted beam to the photodetector.

6. The holographic optical pickup device according to claim 1, wherein when the hologram is spirally formed on the optical information recording medium with a circular shape, the light receiver of the photodetector is provided while being shifted from a position of the region to be recorded or reproduced in a radial direction by a predetermined amount.

7. The holographic optical pickup device according to claim 1, wherein the light receiver of the photodetector is divided into a plurality of light receiving planes.

8. The holographic optical pickup device according to claim 7, wherein the position error signal is generated from a differential signal of a plurality of signals derived from the plurality of light receiving planes of the photodetector.

9. An optical information recording and reproducing device that records an information signal by forming a hologram on an optical information recording medium, or reproduces the information signal from the hologram on the optical information recording medium, comprising:
the holographic optical pickup device according to claim 1;
a signal generation circuit that transmits the information signal to be recorded to the spatial light modulator in the holographic optical pickup device;
a signal processing circuit that reproduces the information signal using a signal detected by the image sensor in the holographic optical pickup device;
a servo signal generation circuit that generates a position error signal of the optical information recording medium using the signal detected by the photodetector in the holographic optical pickup device; and
an optical information recording medium drive element that drives positioning of the optical information recording medium in accordance with the position error signal.

10. A method of recording and reproducing optical information, which records an information signal by irradiating an optical information recording medium with a reference beam and a signal beam to form a hologram, or reproduces the information signal by irradiating the hologram on the optical information recording medium with the reference beam, comprising the steps of:
detecting a diffracted beam generated from a region other than a region to be recorded or reproduced in the optical information recording medium when irradiating the optical information recording medium with the reference beam;
generating a position error signal indicating positional shifting of the region to be recorded or reproduced of the optical information recording medium using the detected signal; and
driving the optical information recording medium for positioning in accordance with the position error signal.

* * * * *